United States Patent
Veilleux, Jr. et al.

(10) Patent No.: US 11,236,682 B2
(45) Date of Patent: Feb. 1, 2022

(54) FUEL PUMP SYSTEMS FOR TURBOMACHINES

(71) Applicant: Hamilton Sundstrand Corporation, Charlotte, NC (US)

(72) Inventors: Leo J. Veilleux, Jr., Wethersfield, CT (US); Lubomir A. Ribarov, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 718 days.

(21) Appl. No.: 15/902,898

(22) Filed: Feb. 22, 2018

(65) Prior Publication Data
US 2019/0257250 A1 Aug. 22, 2019

(51) Int. Cl.
*F02C 9/26* (2006.01)
*F02M 39/02* (2006.01)
(Continued)

(52) U.S. Cl.
CPC ............... *F02C 9/26* (2013.01); *F02C 7/236* (2013.01); *F02M 39/02* (2013.01); *F02M 59/447* (2013.01); *F04C 15/0061* (2013.01); *F04D 13/12* (2013.01); *F04D 25/06* (2013.01); *F04D 27/009* (2013.01); *F04D 29/22* (2013.01); *F04D 29/5806* (2013.01); *F04C 2/084* (2013.01);
(Continued)

(58) Field of Classification Search
CPC .... F02C 9/26; F02C 9/30; F02C 7/236; F04D 27/009; F04D 29/5806; F04D 13/12; F02M 39/02; F02M 59/447
See application file for complete search history.

(56) References Cited

U.S. PATENT DOCUMENTS 5,918,578 A * 7/1999 Oda ................. F02D 41/22
123/456
6,058,912 A * 5/2000 Rembold ............ F02D 41/3082
123/179.17
(Continued)

FOREIGN PATENT DOCUMENTS

DE 19539885 A1 11/1996
DE 102009029573 A1 3/2011

OTHER PUBLICATIONS

Extended European search report issued in corresponding European patent application No. 19156984.7, dated Jul. 9, 2019.

*Primary Examiner* — Christopher S Bobish
(74) *Attorney, Agent, or Firm* — Locke Lord LLP; Daniel J. Fiorello; Gabrielle L. Gelozin

(57) ABSTRACT

A fuel pump system for a turbomachine engine can include a boost pump driven by an electric motor and configured to be in fluid communication with a fuel tank, a primary pump configured to be driven by a shaft connected to the turbomachine engine, wherein the primary pump is in fluid communication with the boost pump downstream of the boost pump by a boost branch, a bypass flow branch that connects the boost branch to a downstream branch that is downstream of the primary pump, the downstream branch is in fluid communication with one or more metering valves and/or one or more fuel nozzles, and a bypass valve disposed in the bypass flow branch and/or the downstream branch and configured to selectively directly fluidly communicate the boost branch and the downstream branch.

15 Claims, 2 Drawing Sheets

(51) Int. Cl.
  *F02C 7/236* (2006.01)
  *F04C 15/00* (2006.01)
  *F04D 25/06* (2006.01)
  *F04D 27/00* (2006.01)
  *F04D 29/22* (2006.01)
  *F04D 29/58* (2006.01)
  *F02M 59/44* (2006.01)
  *F04D 13/12* (2006.01)
  *F04C 2/08* (2006.01)

(52) U.S. Cl.
  CPC .... *F05D 2220/323* (2013.01); *F05D 2260/85* (2013.01)

(56) References Cited

U.S. PATENT DOCUMENTS

| | | | | |
|---|---|---|---|---|
| 6,889,656 B1* | 5/2005 | Rembold | ............ | F02D 41/062 123/446 |
| 7,281,520 B2* | 10/2007 | Klenk | ............ | F02M 37/04 123/446 |
| 7,983,541 B2* | 7/2011 | Clements | ............ | F02M 31/205 392/471 |
| 8,234,875 B2* | 8/2012 | Falke | ............ | F02C 7/232 60/776 |
| 8,276,360 B2* | 10/2012 | Poisson | ............ | F01D 19/00 60/39.281 |
| 8,833,343 B2* | 9/2014 | Pursifull | ............ | F02M 59/447 123/457 |
| 9,702,301 B2* | 7/2017 | Potel | ............ | F02C 7/224 |
| 10,337,513 B2* | 7/2019 | Reul | ............ | F04D 13/0653 |
| 2002/0069856 A1* | 6/2002 | Mayer | ............ | F02M 37/041 123/510 |
| 2004/0211395 A1* | 10/2004 | Greco | ............ | F02D 41/3836 123/497 |
| 2005/0205065 A1* | 9/2005 | Rembold | ............ | F16K 17/0406 123/446 |
| 2005/0284148 A1* | 12/2005 | Wernberg | ............ | F02C 9/32 60/734 |
| 2006/0266047 A1* | 11/2006 | Eick | ............ | F02C 7/236 60/776 |
| 2007/0044768 A1* | 3/2007 | Eick | ............ | F02C 7/236 123/478 |
| 2013/0192679 A1* | 8/2013 | Ripley | ............ | B64D 37/34 137/2 |
| 2014/0174409 A1 | 6/2014 | Ripley | | |
| 2016/0047394 A1* | 2/2016 | Lee | ............ | F04D 29/5806 417/423.11 |

* cited by examiner

FUEL PUMP SYSTEMS FOR TURBOMACHINES

BACKGROUND

1. Field

The present disclosure relates to fuel pump systems for turbomachines.

2. Description of Related Art

During a windmill engine re-light (following an in-flight shut down), the engine turns slowly (e.g., about 5-8% of its typical idle speed). Due to this low rotating speed, any engine gearbox-driven fuel pumps may not provide sufficient fuel flow and pressure to the engine fuel nozzles which can inhibit reliable engine restart. It is desirable to ensure a reliable engine re-light during windmill engine conditions, for example.

Such conventional methods and systems have generally been considered satisfactory for their intended purpose. However, there is still a need in the art for improved fuel pump systems. The present disclosure provides a solution for this need.

SUMMARY

A fuel pump system for a turbomachine engine can include a boost pump driven by an electric motor and configured to be in fluid communication with a fuel tank, a primary pump configured to be driven by a shaft connected to the turbomachine engine, wherein the primary pump is in fluid communication with the boost pump downstream of the boost pump by a boost branch, a bypass flow branch that connects the boost branch to a downstream branch that is downstream of the primary pump, the downstream branch is in fluid communication with one or more metering valves and/or one or more fuel nozzles, and a bypass valve disposed in the bypass flow branch and/or the downstream branch and configured to selectively directly fluidly communicate the boost branch and the downstream branch.

The bypass valve can be or can include a check valve. The check valve can be configured to open with a predetermined pressure from the boost pump to cause fluid communication between the boost branch and the downstream branch. The bypass valve can be or can include a three way valve, for example. Any other suitable valve type is contemplated herein.

The primary pump can be a gear pump and the boost pump can be a centrifugal pump. Any other suitable pump types as appreciated by those having ordinary skill in the art are contemplated herein.

The electric motor can be controlled by a controller. In certain embodiments, the controller can be a full authority digital engine control (FADEC). In certain embodiments, at least one of the FADEC and the electric motor (e.g., both) can be cooled by fuel flowing through the system. For example, the FADEC can be in cooling flow communication with the bypass branch, and the electric motor can be in cooling flow communication with both the FADEC and the boost pump to create loop through the boost pump.

In certain embodiments, the controller can be operatively connected to a speed sensor that senses the speed of the shaft. The controller can control the electric motor as a function of shaft speed (e.g., the controller can increase speed of the electric motor when shaft speed is low).

The controller can be configured to control the bypass valve between a normal flow position where flow is prevented from flowing through the bypass branch to the downstream branch, and a bypass position where flow is allowed to flow through the bypass branch to the downstream branch. The controller can be configured to control the electric motor as a function of bypass valve position such that the controller increases electric motor speed when the bypass valve is in the bypass position.

The shaft that the primary pump is connected to can be a gear box shaft connected to a gear box. The gear box can be connected to an engine shaft.

In accordance with at least one aspect of this disclosure, a fuel system for turbomachine engine can include an electric motor driven boost pump and a mechanically driven primary pump, the boost pump configured to supply boost pressure to the primary pump, and a flow system configured to allow the boost pump to bypass the primary pump to allow the boost pump to provide direct pressure to one or more fuel metering valves and/or one or more fuel nozzles.

In accordance with at least one aspect of this disclosure, fuel system for turbomachine engine can include a mechanically driven primary pump, a boost pump driven by an electric motor configured to supply pressurized fuel to the primary pump, and a flow system configured to allow the boost pump to also directly provide pressurized fuel to one or more fuel metering valves and/or one or more fuel nozzles.

In accordance with at least one aspect of this disclosure, a method of providing fuel to a turbomachine engine can include pumping fuel with a primary pump mechanically driven by the turbomachine engine, pumping fuel with a boost pump driven by an electric motor, supplying pressurized fuel from the boost pump to the primary pump, and supplying pressurized fuel from the boost pump directly to one or more fuel metering valves and/or one or more fuel nozzles.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
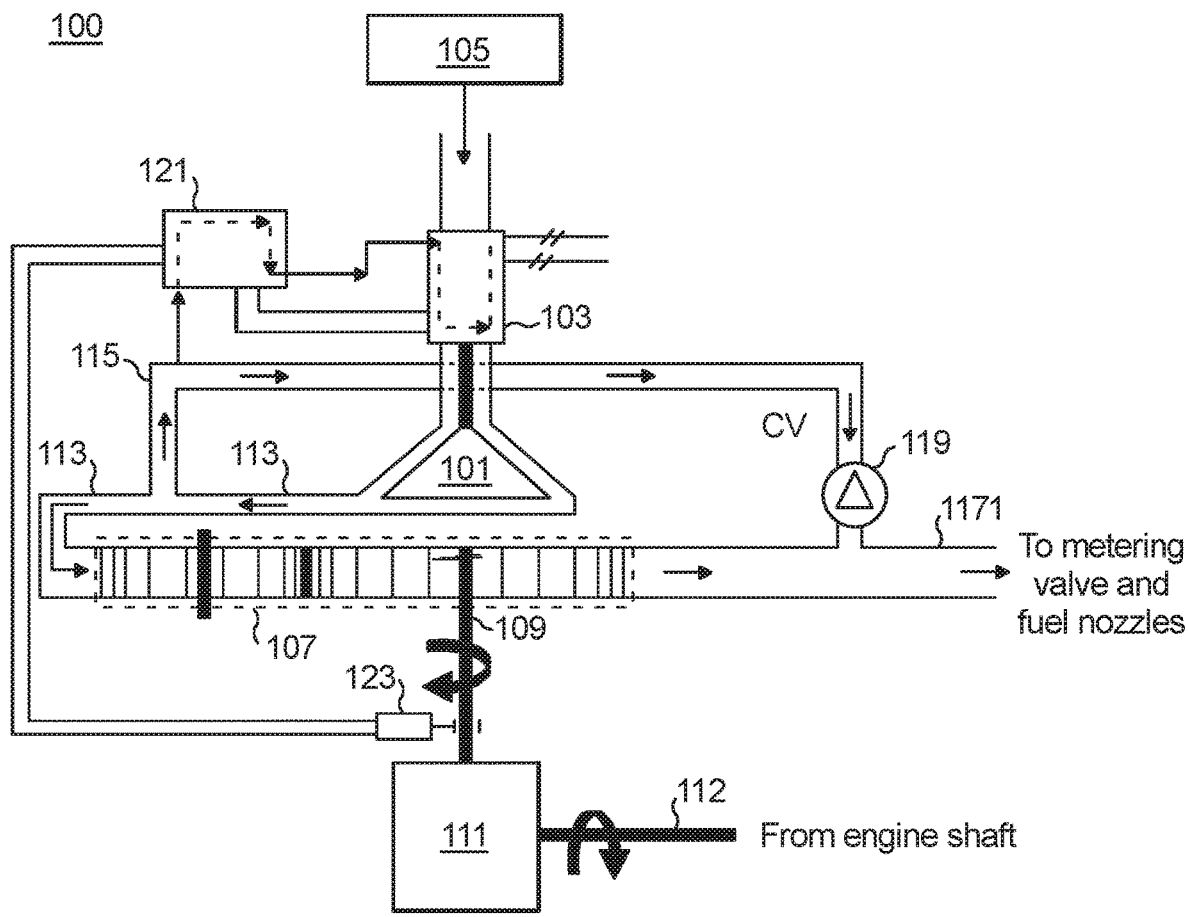
FIG. 1 is a schematic diagram of an embodiment of a system in accordance with this disclosure.
Figure 2:
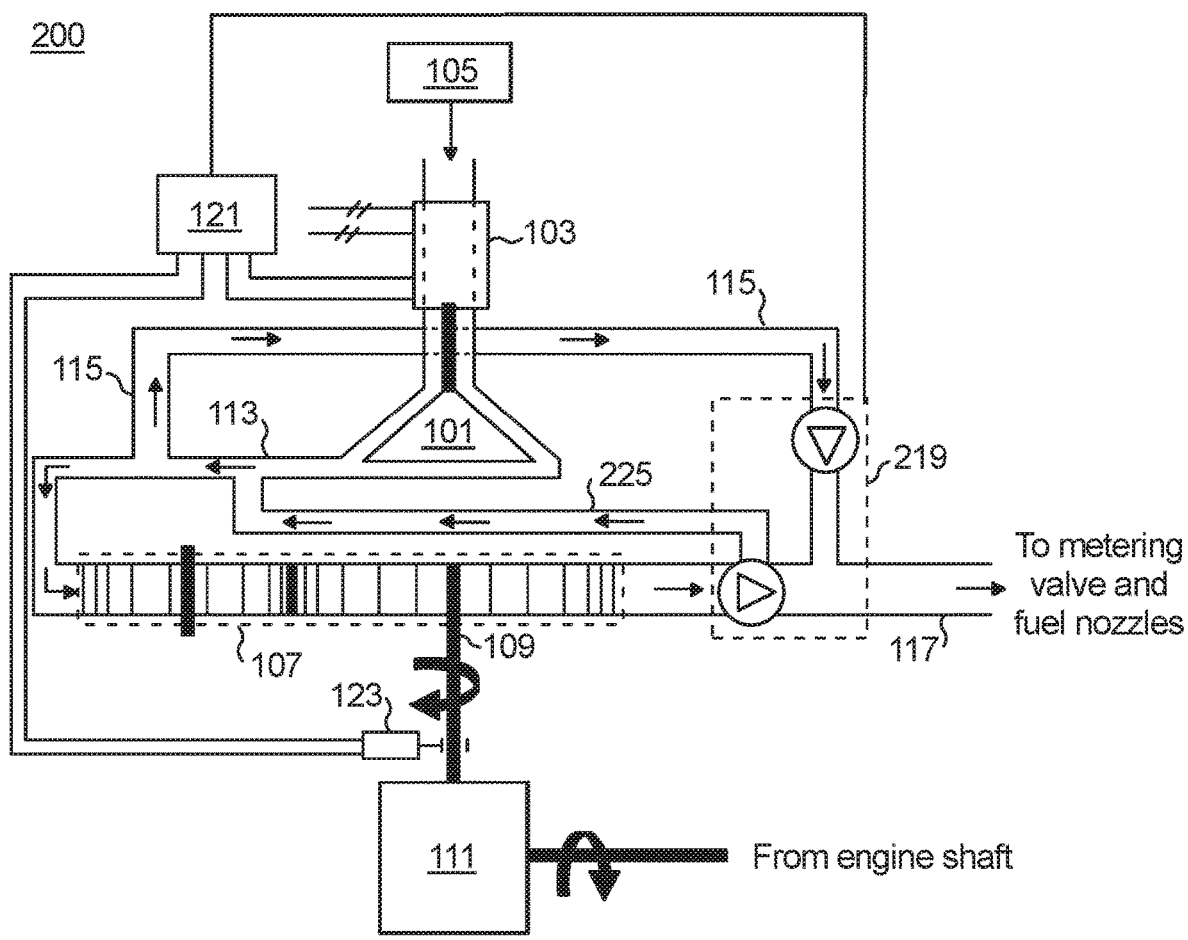
FIG. 2 is a schematic diagram of an embodiment of a system in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIG. 2.

Referring to FIG. 1, a fuel pump system 100 for a turbomachine engine can include a boost pump 101 driven by an electric motor 103 and configured to be in fluid communication with a fuel tank 105. The system 100 can include a primary pump 107 configured to be driven by an input shaft 109 connected to the turbomachine engine (e.g., via a gear box 111). The primary pump 107 is in fluid communication with the boost pump 101 downstream of the boost pump 101 by a boost branch 113.

The system 100 also includes a bypass flow branch 115 that connects the boost branch 113 to a downstream branch 117 that is downstream of the primary pump 107. The downstream branch 117 is in fluid communication with one or more metering valves and/or one or more fuel nozzles, for example. A bypass valve 119 disposed in the bypass flow branch 115 and/or the downstream branch 117 and configured to selectively directly fluidly communicate the boost branch 113 and the downstream branch 117.

The bypass valve 119 can be or can include a check valve, as shown in FIG. 1. The check valve can be configured to open with a predetermined pressure from the boost pump 101 to cause fluid communication between the boost branch 115 and the downstream branch 117. Referring to the embodiment of FIG. 2, a system 100 can include a bypass valve 219 that can be or can include a three-way valve, for example. Any other suitable valve type (e.g., a selector valve, a four-way valve) and/or number of valves is contemplated herein.

Referring to FIG. 1, the primary pump 107 can be a gear pump and the boost pump 101 can be a centrifugal pump. Any other suitable pump types as appreciated by those having ordinary skill in the art are contemplated herein. The shaft 109 that the primary pump 107 is connected to can be a gear box shaft connected to a gear box 111. The gear box 111 can be connected to an engine shaft 112, for example.

The electric motor 103 can be operatively connected to and controlled by a controller 121. The controller can include any suitable hardware modules and/or software modules to perform functions as described herein and as appreciated by those having ordinary skilled in the art. In certain embodiments, the controller 121 can be a full authority digital engine control (FADEC). In certain embodiments, at least one of the controller 121 and the electric motor (e.g., both) can be cooled by fuel flowing through the system 100, 200. For example, as shown in FIG. 1, the controller 121 can be in cooling flow communication with the bypass branch 115 and/or the boost branch 113, and the electric motor 103 can be in cooling flow communication with both the controller 121 and the boost pump 101 to create loop through the boost pump 101.

In certain embodiments, the controller 121 can be operatively connected to a speed sensor 123 that senses the speed of the input shaft 109. The controller 121 can control the electric motor 103 as a function of the input shaft speed. For example, the controller 121 can increase speed of the electric motor when the input shaft speed is low to cause the valve 119 to open to provide more pump pressure to the fuel metering valves and/or the fuel nozzles (e.g., when the engine is at low RPM caused by wind milling, and/or in flight settings where pressure from the boost pump 101 alone is sufficient and/or desired, and/or at start up).

In certain embodiments, e.g., as shown in FIG. 2, the controller 121 can be operatively connected to the bypass valve 219 and configured to control the bypass valve 219 between a normal flow position where flow is prevented from flowing through the bypass branch 115 to the downstream branch 117, and a bypass position where flow is allowed to flow through the bypass branch 115 to the downstream branch 117. The controller 121 can be configured to control the electric motor 103 as a function of bypass valve 219 position such that the controller increases electric motor speed when the bypass valve 219 is in the bypass position.

In certain embodiments, as shown in FIG. 2, it may be beneficial to have a return line 225 that allows pressure from the primary pump 107 to return to the boost branch 113 if the primary pump 107 is blocked by the bypass valve 219 when the bypass valve 219 allows flow from the bypass branch 115 to the downstream branch 117. This can prevent dead heading, for example. As shown in FIG. 2, the controller can control valve 219 to allow flow from bypass branch 115 to the downstream branch 117, and at the same time, cut off flow from the primary pump 107 to the downstream branch 117 but cause fluid communication between an output of the primary pump 107 and the boost branch 113. Any other suitable flow circuit to prevent dead heading is contemplated herein.

In accordance with at least one aspect of this disclosure, a fuel system (e.g., 100, 200) for turbomachine engine can include an electric motor driven boost pump and a mechanically driven primary pump, the boost pump configured to supply boost pressure to the primary pump, and a flow system configured to allow the boost pump to bypass the primary pump to allow the boost pump to provide direct pressure to one or more fuel metering valves and/or one or more fuel nozzles.

Certain embodiments utilize a compact electro-mechanical hybrid fuel pump system. Embodiments include a centrifugal pump driven by an electric motor and a gear pumps driven by the engine gearbox. Fuel flow from the fuel tanks can be drawn into the centrifugal pump. The centrifugal pump is driven by an electric motor. The electric motor may be fuel-cooled as well. The electrical motor-driven boost pump provides pressurized fuel to the inlet of primary pump similar to a mechanical driven boost pump, thus ensuring no cavitation occurs in primary pump.

The speed of the boost pump can be increased or decreased to stay below maximum allowed boost pressure for actuator force margins, to allow optimization of the boost pump sizing, and provide optimal gear pump feed pressure to satisfy low inlet conditions and high inlet conditions for minimizing cavitation, for example. Use of the electric hybrid path boost pump also allows for a smaller primary pump by allowing use of the boost pump during normal speed starts.

Embodiments include an electric boost pump in parallel and series with the primary pump to provide multiple advantages. Embodiments allow control between series mode and parallel mode as needed or desired.

Embodiments allow sufficient pressure for engine restart after an in-flight shut down where the primary mechanical pump is operating at low speed and, thus, provides unreliable fuel pressure. In certain embodiments, the boost pump can be used to provide fuel as needed in cruise (e.g., as needed for thermal efficiency instead of based on engine speed since boost pump speed can be controlled independent of engine speed, which in turn, improves the heat sink capabilities of the on-board fuel).

As appreciated by those having ordinary skill in the art in view of this disclosure, in the case of a windmill engine re-light, it is beneficial to boost the fuel pressure from the slowly turning (engine gearbox-driven) gear pump. Existing gear pump systems cannot provide sufficient fuel flow and pressure as the engine's rotational speed during windmill is low (e.g., about 5-8% of typical engine idle speed). In an intermediate state it is possible that the boost pump and the gear pump can sum their outputs.

In embodiments, the rotation of the engine-driven gear pump's input shaft can be detected by an engine speed sensor. These signals can be sent to the controller, e.g., the FADEC. The FADEC, in turn, can command the electric motor of the centrifugal pump to increase its rotational speed. This results in higher fuel flow being drawn from the fuel tanks by the centrifugal pump. In addition, the centrifugal pump can pressurize this increased fuel flow prior to delivering it as boost fuel pressure to the engine's fuel nozzles. In turn, this allows a reliable engine re-light during engine wind milling conditions.

The output of the centrifugal pump can flows through a bypass valve such as a check valve, most selector, or three-way valve downstream of the outlet of the gear pump. This fuel can be modulated downstream to the correct fuel flow/pressure delivery to the engine fuel nozzles. The speed of the electrically-driven centrifugal pump can be varied independently from the speed of the gearbox-driven gear pump. Embodiments allow operational flexibility of the fuel flow and pressure delivery, making it independent of engine rotational speed. For example, during initial engine start, the centrifugal pump can be commanded to turn at higher/maximum speed, thus providing boost pressure flow to start the engine reliably. The speed of the electrically-driven centrifugal pump can be controlled by the FADEC at all times.

Embodiments allow compact, simplified fuel delivery system utilizing an electro-mechanical hybrid fuel pump system, optimal centrifugal pump speeds during operation, optimal gear pump sizing and boost pump sizing, limitation of max boost pressure for actuator force margin sizing points, a compact centrifugal pump that always provides pressurized fuel to the primary pump thus eliminating cavitation in the primary pump, capabilities to deliver higher fuel flow/pressure to fuel nozzles during windmill engine re-lighting, and capability to vary rotational speed of electrically-driven centrifugal pump independently of mechanically-driven gear pump.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of one or more methods, apparatuses (e.g., controllers), systems, and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Any suitable combination(s) of any disclosed embodiments and/or any suitable portion(s) thereof is contemplated therein as appreciated by those having ordinary skill in the art.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A fuel pump system for a turbomachine engine, comprising:
    a boost pump driven by an electric motor and configured to be in fluid communication with a fuel tank;
    a primary pump configured to be driven by an input shaft connected to the turbomachine engine, wherein the primary pump is in fluid communication with the boost pump downstream of the boost pump by a boost branch;
    a bypass flow branch that connects the boost branch to a downstream branch that is downstream of the primary pump, wherein the downstream branch is in fluid communication with one or more metering valves and/or one or more fuel nozzles; and
    a bypass valve disposed in the bypass flow branch and/or the downstream branch and configured to selectively directly fluidly communicate the boost branch and the downstream branch, wherein the bypass valve includes a three-way valve, wherein when the bypass valve is in a bypass position, the bypass valve prevents flow from the primary pump to the downstream branch, allows fluid communication between an output of the primary pump and the boost branch, such that flow from the bypass branch flows to the downstream branch, wherein the electric motor is controlled by a controller, wherein the controller is operatively connected to a speed sensor that senses the speed of the input shaft, and the controller controls the electric motor at least in part as a function of the input shaft speed.

2. The system of claim 1, wherein the bypass valve includes a check valve.

3. The system of claim 2, wherein the check valve is configured to open with a predetermined pressure from the boost pump to cause fluid communication between the boost branch and the downstream branch.

4. The system of claim 1, wherein the primary pump is a gear pump and the boost pump is a centrifugal pump.

5. The system of claim 1, wherein the controller is a full authority digital engine control (FADEC).

6. The system of claim 5, wherein at least one of the FADEC and the electric motor is cooled by fuel flowing through the system.

7. The system of claim 6, wherein the FADEC is in cooling flow communication with the bypass branch, wherein the electric motor is in cooling flow communication with both the FADEC and the boost pump to create loop through the boost pump.

8. The system of claim 1, wherein the controller is configured to control the bypass valve between a normal flow position where flow is prevented from flowing through the bypass branch to the downstream branch, and the bypass position where flow is allowed to flow through the bypass branch to the downstream branch.

9. The system of claim 8, wherein the controller is configured to control the electric motor as a function of bypass valve position such that the controller increases electric motor speed when the bypass valve is in the bypass position.

10. The system of claim 1, wherein the input shaft is a gear box shaft connected to a gear box, wherein the gear box is connected to a shaft of the turbomachine engine.

11. A fuel system for a turbomachine engine, comprising:
    a mechanically driven primary pump configured to be driven by an input shaft connected to the turbomachine engine;
    a boost pump driven by an electric motor configured to supply pressurized fuel to the primary pump via a boost branch;
    a bypass valve that includes a three-way valve disposed in a downstream branch downstream of the primary pump and the boost pump, and
    a flow system configured to allow the boost pump to also directly provide pressurized fuel to one or more fuel metering valves and/or one or more fuel nozzles through a bypass branch to the downstream branch, such that when the bypass valve is in a bypass position, flow from the primary pump does not flow to the downstream branch, and the bypass valve allows communication between an output of the primary pump and the boost branch, wherein the electric motor is controlled by a controller, wherein the controller is operatively connected to a speed sensor that senses the speed of the input shaft, and the controller controls the electric motor at least in part as a function of the input shaft speed.

12. The system of claim 11, wherein the primary pump is a gear pump and the boost pump is a centrifugal pump.

13. The system of claim 11, wherein the controller is a full authority digital engine control (FADEC).

14. The system of claim 13, wherein at least one of the FADEC and the electric motor is cooled by fuel flowing through the system.

15. A method of providing fuel to a turbomachine engine, comprising:
    pumping fuel with a primary pump mechanically driven by an input shaft of the turbomachine engine;
    pumping fuel with a boost pump driven by an electric motor;
    supplying pressurized fuel from the boost pump to the primary pump via a boost branch;

moving a bypass valve to a bypass position, wherein the bypass valve is or includes a three-way valve disposed in a downstream branch downstream of the primary pump and the boost pump;

supplying pressurized fuel from the boost pump directly to one or more fuel metering valves and/or one or more fuel nozzles through a bypass branch from the boost branch to the downstream branch such that when the bypass valve is in a bypass position, flow from the primary pump does not flow to the downstream branch, and the bypass valve allows communication between an output of the primary pump and the boost branch; and controlling the electric motor with a controller at least in part as a function of a speed of the input shaft, wherein the controller is operatively connected to a speed sensor that senses the speed of the input shaft.

\* \* \* \* \*